(12) United States Patent
Vieweg et al.

(10) Patent No.: US 6,748,082 B1
(45) Date of Patent: Jun. 8, 2004

(54) METHOD AND DEVICE FOR INTRODUCING A SERVICE KEY INTO A TERMINAL

(75) Inventors: Stefan Vieweg, Willich (DE); Maik Schmidt, Meerbusch (DE)

(73) Assignee: ATX Europe GmbH, Düsseldorf (DE)

( * ) Notice: Subject to any disclaimer, the term of this patent is extended or adjusted under 35 U.S.C. 154(b) by 0 days.

(21) Appl. No.: 09/355,586

(22) PCT Filed: Jan. 28, 1998

(86) PCT No.: PCT/DE98/00277

§ 371 (c)(1),
(2), (4) Date: Jul. 29, 1999

(87) PCT Pub. No.: WO98/34371

PCT Pub. Date: Aug. 6, 1998

(30) Foreign Application Priority Data

Feb. 3, 1997 (DE) .......................................... 197 05 050
Oct. 23, 1997 (DE) .......................................... 197 47 82

(51) Int. Cl.[7] ................................................ H04L 9/00
(52) U.S. Cl. ........................ 380/278; 380/273; 380/277
(58) Field of Search ................................ 380/278, 273; 701/201

(56) References Cited

U.S. PATENT DOCUMENTS 5,729,537 A * 3/1998 Billstrom ...................... 370/329
5,787,172 A * 7/1998 Arnold ......................... 713/175

* cited by examiner

*Primary Examiner*—Gregory Morse
*Assistant Examiner*—Christopher J Brown
(74) *Attorney, Agent, or Firm*—Cohen, Pontani, Lieberman & Pavane

(57) ABSTRACT

A simple, efficient and reliable introduction of a service key into a terminal is made possible by a method for introducing a service key into a terminal where the terminal can use the service key to decrypt service data transmitted in encrypted form from a central control station via a public communication channel. The terminal stores a decoding key which is produced from an initialization value by a terminal programming device using an algorithm. The central control station uses an algorithm corresponding to the algorithm and initialization value in the terminal programming device in order to produce a coding key matching the decoding key. The service key stored in the central control station is coded using the coding key and is transmitted to the terminal where it is decoded using the stored decoding key.

6 Claims, 1 Drawing Sheet

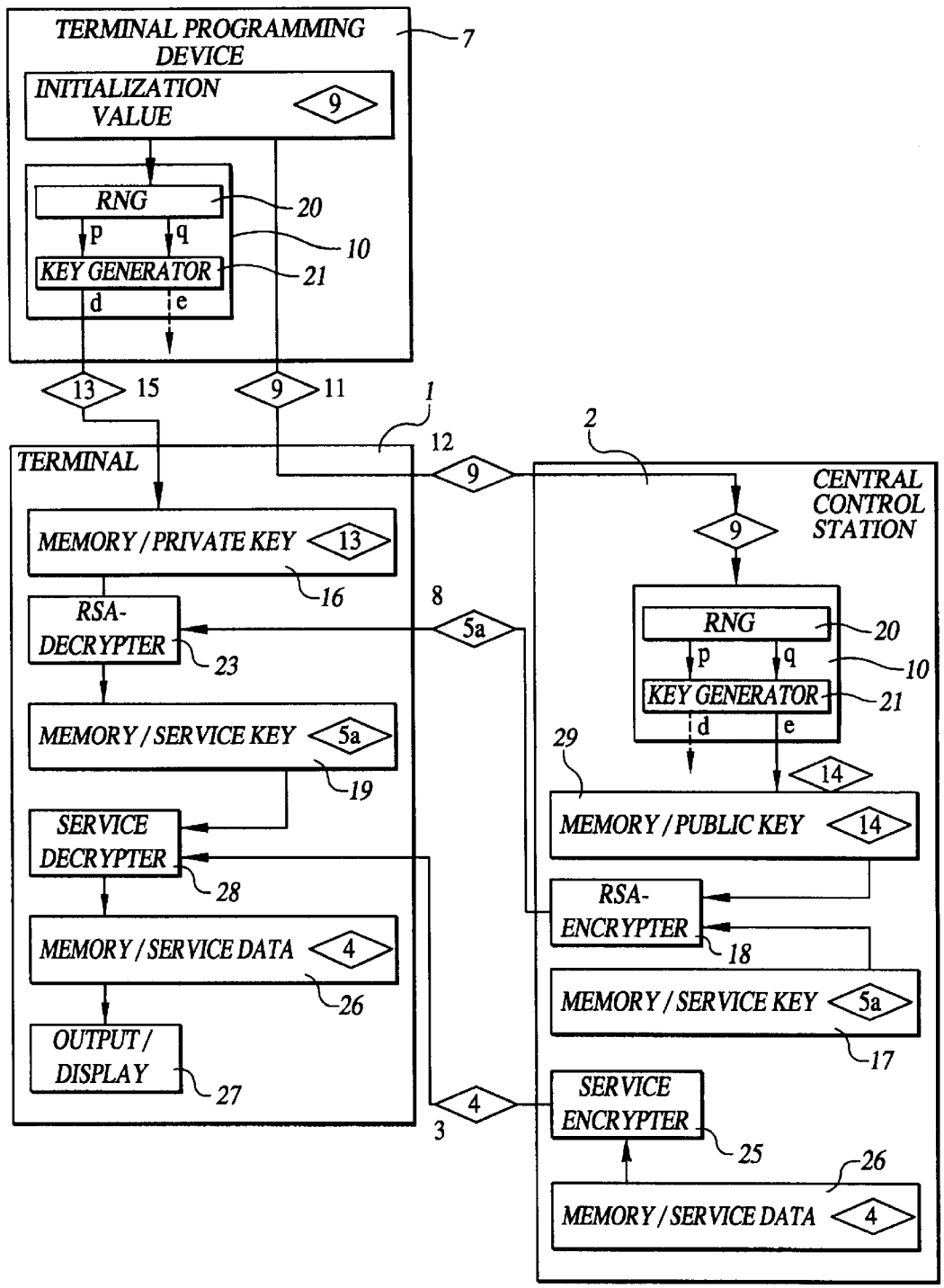

METHOD AND DEVICE FOR INTRODUCING A SERVICE KEY INTO A TERMINAL

PRIORITY CLAIM

This is a U.S. national stage of application No. PCT/DE98/00277, filed on 28 Jan. 1998. Priority under 35 U.S.C. §119(a) and 35 U.S.C. §365(b) is claimed from German Application Nos. 197 05 050.6, filed Feb. 3, 1997 and 197 47 827.1, filed Oct. 23, 1997.

The invention relates to a method for introducing a service key into a terminal.

DESCRIPTION OF THE RELATED ART

In traffic telematics, services which are subject to a charge, i.e. service information in the form of traffic updates, traffic forecasts, navigation aids etc., are transmitted in encrypted form from a central control station to a respective terminal belonging to a service user. Only a terminal with a service key for service data transmitted for one or more booked services from the central control station to the terminal is able to decrypt the service data relating to the respective service and make it available to the user of the terminal. Coding is necessary, in particular, if service data is transmitted from the central control station to terminals via a public communication channel, e.g. a radio channel. Even when service data is transmitted via a private communication channel, such as a mobile radio short message channel (GSM.SMS), an authenticity check of the terminal for the central control station is necessary or data encrypted in the central control station needs to be decoded by a key in the terminal.

Methods are known in which a secret feature which can be used for authenticity checking when contact is made between a terminal and a central control station providing a service or for coding/decoding service data transmitted from the central control station to the terminal is introduced into the terminal by a terminal manufacturer and is transmitted to the central control station providing the service. For this purpose, however, a communication channel which is secure against tapping is necessary between the terminal manufacturer and the central control station. Transmission of secret features involves considerable logistical effort and the risk of errors.

SUMMARY OF THE INVENTION

The object of the present invention is to enable, simply, inexpensively, efficiently and as reliably as possible, a service key for decrypting service data transmitted in encrypted form by a central control station to be introduced into a terminal.

According to the invention, a central control station service key relating to one or more services can be introduced into a terminal simply, efficiently and reliably. The result of encrypted transmission between the central control station and the terminal and of the algorithms, whose results are identical for the same initialization key (particularly with a random number generator), in the central control station and in the terminal programming device on the manufacturer's premises is a high level of security against tapping. If the initialization value and the decoding key are introduced into a terminal by the terminal programming device (of a manufacturer etc.), and the initialization key is then transmitted from the terminal (for example via a channel secured against tapping, such as a telecommunication channel, particularly a mobile radio channel) to the central control station, no communication between the manufacturer and the central control station when the key is introduced is necessary at all now. This means that the method is very simple, the administrative effort for the manufacturer is significantly reduced, and errors are avoided.

The terminals can, in particular, be telematic terminals, central control station can be a traffic information center, and the service data can, in particular, be traffic telematic data (such as traffic information, traffic forecasts, navigation aids etc.).

The method according to the invention can be implemented using different public-key/private-key coding/decoding methods. In this context, the decoding key corresponds to a private key and the coding key corresponds to a public key.

The efficient RSA method is particularly suitable. In addition, other public-key/private-key methods involving discrete logarithms, elliptical curves, the Knapsack algorithm and others can also be used.

The service key can be transmitted from the central control station to a terminal using different encryption/decryption methods. In addition to asymmetrical methods (public key/private key), symmetrical methods can also be used. The DES method is relatively quick for decoding, with average reliability.

The algorithm, which is implemented identically or identically in terms of result in the terminal programming device of a manufacturer and in the central control station, can contain, in particular, a pseudo random number generator. The pseudo random number generator always supplies the same output value when a specific initialization value is input. If a random number generator is used to produce a coding key and a decoding key on the basis of the RSA method, the numbers supplied by an arbitrary random number generator, for example, can be used to produce prime numbers such that the prime numbers which are next highest in respect of the supplied random numbers are produced. In this context, two prime numbers, preferably with a value higher than $10^{100}$, are input using the random number generator and a downstream algorithm for inputting into the RSA coding/decoding key generator. In addition, a standardized prime number generator can also be used directly. The coding key and the decoding key correspond to the two output values of an RSA key generator.

Transmission between the terminal and the central control station expediently takes place by telecommunication, particularly by mobile radio. It is particularly simple and, in terms of automatization ability, efficient for transmission to be in the form of a digital mobile radio short message, for example GSM-SMS.

BRIEF DESCRIPTION OF THE DRAWINGS

Other features and advantages will be found in the following description of an exemplary embodiment with reference to the drawing. In this case, the single FIGURE shows a block diagram of the manufacturer's terminal programming device, a terminal and a central control station according to the present invention.

The terminal 1 is a telematic terminal which can be installed, in particular, in a motor vehicle and which is provided, in particular, for using services offered by a traffic telematic central control station 2. Such services can, for example, be service data 4 transmitted 3 from the central control station 2 to the terminal 1, such as traffic information, traffic forecasts, navigation aid data etc.

Transmission 3 can take place by telecommunication, preferably by mobile radio, e.g., GSM-SMS. It can also take place via a communication channel accessible to the public, such as a radio channel, particularly a digital radio channel. In order for the terminal to identify itself to the central control station when communicating with the central control station 2 via a telecommunication channel 3, and so that the terminal 1 can decode service data 4 broadcast in encrypted form via an open channel such as radio, the terminal needs a secret feature which is associated with a secret feature in the central control station 2.

In order for the terminal 1 to use service data 4 which is encrypted by the central control station 2 using a service key 5a and to display (27) it to a user, the service data 4 is decrypted in the terminal 1 using a service key 5a. The service keys 5a and 5b (not shown) can be identical in the case of symmetrical coding/decoding methods for traffic news and can be mutually associated public and private keys in the case of asymmetrical coding/decoding methods.

It is expedient in this case if the keys in the terminal and the central control station are not permanent keys but are stored such that they can be changed, so that bookings at the terminal for specific services offered by the central control station or cancellations for services can be taken into account. In addition, in this way it is a relatively simple matter to decouple access authorization for a service from a physical terminal, which makes it possible to sell on the terminal independently of the service use authorization.

To introduce the service key 5a into the terminal, it would be possible to transmit the same key from the terminal programming device 7 to the terminal and to the central control station. However, to do this, the terminal manufacturer etc. using the terminal programming device would still need to expend the administrative effort, communication with the central control station would be necessary, and errors would be likely to occur.

According to the invention, the service key 5a is transmitted 8 to the terminal 1 from the central control station 2. With this arrangement, when the service key 5a is transmitted 8 from the central control station 2 to the terminal 1, the central control station 2 stores the service key 5a in encrypted form. The service key 5a to be transmitted 8 from the central control station 2 to the terminal 1 is encrypted and is decrypted on the basis of an associated pair of keys 13, 14. In this case, a respective part of the pair of keys is generated from an identical initialization value 9 by an algorithm implemented to have the same effect in the central control station 2 and in the terminal programming device 7.

The initialization value 9, which is selected arbitrarily in the terminal programming device 7 and can be derived from the current time by means of a random number generator, for example, and is used by the algorithm 10 in the terminal programming device 7. The initialization value 9 is transmitted 11 to the terminal 1 and further transmitted 12 unchanged from the terminal to the central control station 2. This means that a respective part 13 and 14 of a pair of coding/decoding keys is produced by the algorithm 10 in the terminal programming device 7 and having in the central control station 2 using the same initialization value 9. The other part of the pair of coding/decoding keys 14, 13 in each case is thus respectively not produced or is ignored.

The decoding key 13 produced in the terminal programming device 7 using an initialization value 9 is transmitted 15 from the terminal programming device 7 to the terminal 1. This operation can be performed, for example, by the manufacturer via a data line from the terminal programming device 7 to the terminal 1 similarly transmission 15 from the terminal programming device 7 to the terminal 1 is possible by telecommunication, radio, particularly mobile radio, particularly mobile radio short message (for example GSM-SMS). The decoding key 13 transmitted 15 from the terminal programming device 7 to the terminal 1 is stored in a memory 16 in the terminal 1. The identical initialization value 9 (transmitted from the terminal programming device 7 via the terminal 1 to the central control station 2) is used by the algorithm 10 (which has an identical effect to the algorithm 10 in the terminal programming device 7) in the central control station 2 to generate the coding key 14, which matches the decoding key 13. The coding key 14 generated (on the basis of the identical initialization value 9) is stored in the central control station 2 in a memory 29.

The coding key 14 stored in the central control station 2 in this manner is used so that it encrypts, in an encrypter 18, a service key 5a (which, in the terminal 1, enables encrypted service data such as traffic news from the central control station 2 to be decrypted at the terminal) stored 17 and defined in the central control station 2 independently of the latter. The encrypted service key 5a is transmitted from the central control station 2 to the terminal 1; the terminal 1 decrypts 23 the transmitted 8 key 5a using the decoding key 13 (which matches the coding key 14 in the central control station) stored in the terminal 1 and previously transmitted from the terminal programming device 7 to the terminal 1. The decrypted service key 5a is stored in the terminal 1 in a memory 19.

The service key 5a now stored in the terminal 1 enables the terminal 1 to decrypt 28 service data 4 received by the terminal 1 from the central control station 2 and thus to make it accessible to a user of the terminal.

In this context, the central control station knows which service key it has transmitted to which terminal.

If appropriate, it is also possible for a plurality of service keys 5a to be implemented in the terminal (and, in line with this, in the central control station) as indicated above for a plurality of different services from the central control station.

The service key 5a can be a symmetrical key. In this case, service data 4 in the central control station 2 is encrypted 25 using the same key 5a as is used to decrypt it in the terminal 1. It is also possible to use a pair of keys (RSA), traffic data being encrypted in the central control station 2 using a key 5b (not shown) and the traffic data being decrypted in the terminal 1 using the key 5a, which matches the key 5b.In this case, the key 5a is implemented in the terminal as above and the central control station therefore has a further key 5b. In addition, the terminal contains a decryption algorithm for service data 4, said decryption algorithm being suitable for the pair of keys 5a, 5b.

The algorithm 10 having the same effect in the terminal programming device 7 and in the central control station 2 produces the same pairs of keys 13, 14 for the same initialization value 9. In particular, it can contain a random number generator (RNG) 20. With a specific initialization value at the input, such a random number generator 20 supplies a constantly identical output value (for this initialization value). Such a random number generator can be used to generate two input numbers, for example, for a key generator. If the key generator 21 is an RSA key generator, the random number generator produces two random numbers which are prime numbers or uses two random numbers which have been produced to produce two prime numbers associated with them, for example the next highest prime numbers, and inputs these into the key generator 21. If the key generator 21 is an, RSA key generator, the coding key it outputs is a public key 14 and the decoding key it outputs is a private key 13. The RSA method produces two prime numbers p and q; these are used to calculate n=p×q and z=(p−1)×(q−1). After that, a number d is sought which is a prime number relative to z.

After this, e is sought, so that e×d=1 mod z is true. e is the coding key 14; a number p (=service) is coded c by calculating $c=p^e$ (mod n) in the central control station. d is the decoding key 13; an encrypted number c (=4) is decoded by calculating $p=c^d$ (mod n) in the terminal. Relatively long service data (4) can be encrypted on a byte-by-byte basis. n can be stored in the terminal programming device 7, 10 and in the central control station 2, 10. The technical equivalent of the RSA method is other public-key methods such as methods concerning discrete logarithms, elliptical curves or Knapsack algorithms.

Transmission 11 of the initialization value 9 from the terminal programming device 7 to the terminal 1 can take place together with transmission 15 of the decoding key 13 produced in the terminal programming device 7 for the initialization value 9. The initialization value 9 can be transmitted 12 from the terminal 1 to the central control station 2 via a private communication channel, particularly telecommunication, preferably mobile radio, e.g., mobile radio short message (e.g. GSM-SMS). The same is true of transmission 8 of the service key 5a from the central control station 2 to the terminal 1.

What is claimed is:

1. A method for introducing a service key into a terminal for decrypting encrypted service data transmitted from a central control station to the terminal comprising the steps of:

producing an initialization value in a terminal programming device which has no direct communication link to said central control station;

producing in the terminal programming device a decoding key from the initialization value and an algorithm;

transmitting the decoding key and the initialization value from the terminal programming device to the terminal;

storing the transmitted decoding key in the terminal;

transmitting the initialization value from the terminal to the central control station;

producing in the central control station a coding key matching the decoding key using the initialization value and the algorithm;

coding the service key with the coding key;

transmitting the coded service key from the central control station to the terminal;

decoding in the terminal the coded service key using the stored decoding key; and storing the decoded service key in the terminal.

2. The method set forth in claim 1, wherein the terminal comprises a telematic terminal, said central control station comprises a traffic information center, and said service data comprises traffic telematic data transmitted from the central control station to the terminal.

3. The method set forth in claim 1, wherein said decoding key comprises an RSA private key and said coding key comprises an associated RSA public key.

4. The method set forth in claim 1, wherein the algorithm comprises a psuedo random number generator.

5. The method set forth in claim 1, wherein said steps of transmitting are performed by mobile radio telecommunications comprising mobile radio short message (GSM-SMS).

6. The method set forth in claim 1, further comprising encrypting the service data in the central control station using the service key, and decrypting the service data in the terminal using the service key.

* * * * *